(12) United States Patent
Armstrong et al.

(10) Patent No.: US 6,793,011 B2
(45) Date of Patent: Sep. 21, 2004

(54) FOLDED FIN HEAT SINK ASSEMBLY

(75) Inventors: Ross D. Armstrong, Cambridge (CA); Alin Lla, Kitchener (CA); Victor Kheil, Kitchener (CA)

(73) Assignee: ATS Automation Tooling Systems Inc., Cambridge (CA)

(*) Notice: Subject to any disclaimer, the term of this patent is extended or adjusted under 35 U.S.C. 154(b) by 0 days.

(21) Appl. No.: 10/073,991

(22) Filed: Feb. 14, 2002

(65) Prior Publication Data

US 2002/0139833 A1 Oct. 3, 2002

Related U.S. Application Data

(60) Provisional application No. 60/268,414, filed on Feb. 14, 2001.

(51) Int. Cl.[7] ............................ F28F 19/02; B23K 31/02; B21D 53/02
(52) U.S. Cl. ............................ 165/133; 228/183; 29/729; 29/890.03
(58) Field of Search ............................. 228/183, 262.5, 228/262.6, 262.61, 207, 245, 246, 56.3, 262.51; 29/890.03, 890.037–890.049; 165/133

(56) References Cited

U.S. PATENT DOCUMENTS

| 3,766,977 A | * | 10/1973 | Pravda et al. ................. 165/47 |
| 4,749,627 A | * | 6/1988 | Ishikawa et al. ............ 428/654 |
| 5,077,889 A | * | 1/1992 | Matsuda et al. .............. 29/612 |
| 5,148,862 A | * | 9/1992 | Hashiura et al. ......... 165/134.1 |
| RE35,098 E | * | 11/1995 | Saperstein ............ 29/890.043 |
| 5,732,767 A | * | 3/1998 | Saperstein .................. 165/133 |
| 6,186,390 B1 | * | 2/2001 | Tadauchi et al. ........... 228/56.3 |
| 6,221,197 B1 | * | 4/2001 | Mori et al. .............. 156/308.6 |
| 2002/0046627 A1 | * | 4/2002 | Amita et al. .................. 75/252 |

* cited by examiner

Primary Examiner—L. Edmondson
(74) Attorney, Agent, or Firm—R. Craig Armstrong; Borden Ladner Gervais LLP

(57) ABSTRACT

A folded fin heat sink assembly and a method of fabricating a folded fin heat sink assembly for use as a cooling solution in micro-electronics and/or telecommunication applications. The heat sink assembly is formed by placing a sheet or paste of Sn—Zn solder upon a copper base plate, placing one or more aluminum folded fin assemblies on the solder sheet or paste, heating the base plate, the folded fin assembly and the solder to a temperature exceeding the liquidus temperature of the solder and allowing the solder to flow, and cooling the solder to form a soldered joint between the base plate and the folded fin assembly.

7 Claims, 2 Drawing Sheets

FOLDED FIN HEAT SINK ASSEMBLY

This application claims benefit of U.S. Provisional 60/268,414 filed Feb. 14, 2001.

FIELD OF THE INVENTION

The invention relates to a folded fin heat sink assembly and to a method of fabricating a folded fin heat sink assembly for use as a cooling solution in micro-electronics and/or telecommunication applications. In particular, the invention relates to a method of mounting and soldering an aluminum folded-fin assembly to a copper base plate to form a folded fin heat sink assembly.

BACKGROUND OF THE INVENTION

Integrated circuit devices are increasingly being used in modern electronic applications such as computers. During normal operation, integrated circuit devices generate significant amounts of heat. If this heat is not continuously removed, the device may overheat resulting in damage to the device and/or a reduction in operating performance. One economic solution for cooling such devices is a heat sink mounted on top of the integrated circuit device. Due to this contact, heat generated by the integrated circuit is conducted into the heat sink and away from the integrated circuit. A fan may be provided to assist in moving the heat away. Also, as a general rule, the performance of integrated circuit devices is likely to improve when they are operated at lower temperatures. Hence, heat sink solutions which facilitate a lower integrated circuit operating temperature have an economic value over heat sink solutions offering higher integrated circuit operating temperatures.

Over the years, there has been a trend toward reduction in size and increased clock frequency speeds of integrated circuit devices, coupled with increases in the number of transistors and therefore capacitance within the integrated circuit. These trends have resulted in a proportional increase in the power used by the integrated circuit. Consequently, the heat generated by these devices has also increased. In order to adequately cool these high powered integrated circuit devices, heat sinks with greater cooling capacities have evolved.

Also, the trend toward reduction in size inherently results in greater heat flux density being imposed onto the heat sink. The efficiency of the heat sink in spreading the heat from the heat source to the fins can become a limitation of the heat sink design.

Historically within the microprocessor industry, the majority of heat sink solutions have used aluminum extrusions. In aluminum extrusions, surface area aspect ratios are typically limited to a maximum ratio of 12:1.

In today's marketplace, with microprocessor solutions being offered in the 2.2 GHz clock frequency range, cooling requirements often cannot be met by the technical capabilities offered by aluminum extrusion technology. In order to meet this need heat sink designs have evolved from simple one piece aluminum extrusions to an assembled heat sink format with two or more components in which a denser plurality of fins formed by folded-fin technology is used. Assembled heat sinks offer the ability to use higher conductive materials such as copper in the design of the base plate along with aluminum fins, when spreading the heat from the heat source becomes a limitation. Folded-fin technology, with its low thickness range (0.004"–0.040") and tight fin density capabilities offer heat sink aspect ratios which can approach 40:1 and correspondingly larger surface areas for heat dissipation.

A typical folded-fin heat sink assembly comprises a base plate and a folded-fin assembly mounted an top of the base plate, the folded-fin assembly having a plurality of joined folded-fins extending upwardly from the base plate. A shroud may also be provided surrounding a substantial portion of the folded-fin assembly. The folded-fin assembly is produced by feeding strip aluminum or copper material through a met of blades which are actuated through cam action to produce its accordion-like structure, having a lower web, an upwardly extending fin portion, an upper web, a downwardly extending in portion, and so on, repeating in a progressive zig-zag fashion.

Typically the base plate and the folded-fin assembly are made of materials which have a high thermal conductivity; materials such as aluminum (approximately 200 W/mK) or copper (approximately 400 W/mK) and, in some cases, these two components comprise the heat sink in its totality.

The conventional method of assembling aluminum fins to a copper base plate uses a thermal epoxy process to assemble the dissimilar materials together. This however reduces the performance of the heat sink, as thermal epoxies in general have conductivity levels of only about 1 W/mK.

An alternative approach involves nickel plating the aluminum fins so that they can then be soldered to the copper base plate, using generic tin/lead (Sn/Pb) solder, it being noted that Sn/Pb solder will not bond aluminum. However, nickel plating densely packed aluminum fins typically requires an electro-less nickel-plating process, which adds significant cost in manufacturing.

Yet a further approach involves a brazing process for bonding the aluminum fins to the copper base plate. However, this process step requires an intermediary material such as nickel or iron between the aluminum fins and copper base plate to ensure that low temperature inter-metallics of Cu and Al do not form, resulting in an uncontrollable joining process. Once again, this process requires the additional manufacturing cost associated with providing an intermediary material.

It is therefore desirable to provide a process for bonding the aluminum fins to the copper base plate in which low thermal resistance levels can be achieved within the joint encompassing the bonded elements by utilizing good solder joint practices such as i) the soldering of a flexible (folded fin) element to an inflexible (copper plate) element in order to provide for good flatness control, and ii) providing regular gaps between adjacent elements to enable the even flow of excess solder in the liquidus state, such that the extent of solder material between the elements can be minimized for a superior thermal conduction path, and iii) provide a healthy meniscus curve solder joint between gaps to provide structural strength and facilitate enhanced thermal conductive paths to the individual fin elemental.

Given that there is also a preference in certain applications that the copper base plate be nickel plated, it is also desirable that the process be effective for bonding the aluminum fins to either an unplated base plate or a nickel plated copper base plate.

SUMMARY OF THE INVENTION

It is an object of the invention to provide a method of bonding an aluminum folded-fin assembly to an unplated or a nickel plated copper base plate, to form a folded-fin heat-sink assembly, which obviates or mitigates the disadvantages of known methods and processes as discussed above.

In a first aspect, the invention provides a method of joining an aluminum folded fin assembly to a copper base plate to form a folded fin heat sink assembly, comprising the steps of:

(a) placing a sheet or paste of Sn—Zn solder upon the base plate, (b) placing the folded fin assembly on the solder sheet or paste, (c) heating the base plate, folded fin assembly and solder to a temperature exceeding the liquidus temperature of the solder and allowing the solder to flow, and (d) cooling the solder to form a soldered joint between said base plate and the folded fin assembly.

When the solder is in the form of a sheet, the method may further comprise applying a flux, preferably to the base plate and to the fins, or alternatively to the upper and lower surfaces of the sheet between steps (a) and (b). Alternatively, the solder may be in the form of a paste which includes a flux for the solder. The paste may be stencilled or screen printed onto the base plate.

Preferably, the solder comprises about 91% Sn and about 9% Zn.

The base plate and folded fin assembly may be secured in an assembly fixture and retained therein during steps (b), (c) and (d). Alternatively, the base plate may be placed in a temporary assembly fixture prior to step (a); following step (b), individual fins of the heat sink and the base plate are laser tack welded together at multiple points; the base plate is removed from the temporary assembly fixture; and the base plate, the folded fin assembly and the solder are heated in step (c) and cooled in step (d).

Step (c) may be performed in a reflow oven or at a hot plate soldering station.

According to a further aspect of the invention, there is provided a folded fin heat sink assembly comprising one or more aluminum folded fin assemblies, each of which is soldered to a copper base plate by means of an Sn—Zn solder, preferably having about 91% Sn and about 9% Zn.

BRIEF DESCRIPTION OF THE DRAWINGS

Preferred embodiments of the invention will now be described, by way of example only, with reference to the attached FIG. 1, which is an exploded view of an assembled heat sink, and FIG. 2, which is a megnified view of the soldered joint between the folded fin and copper base plate.

DETAILED DESCRIPTION OF THE INVENTION

Figure 1:
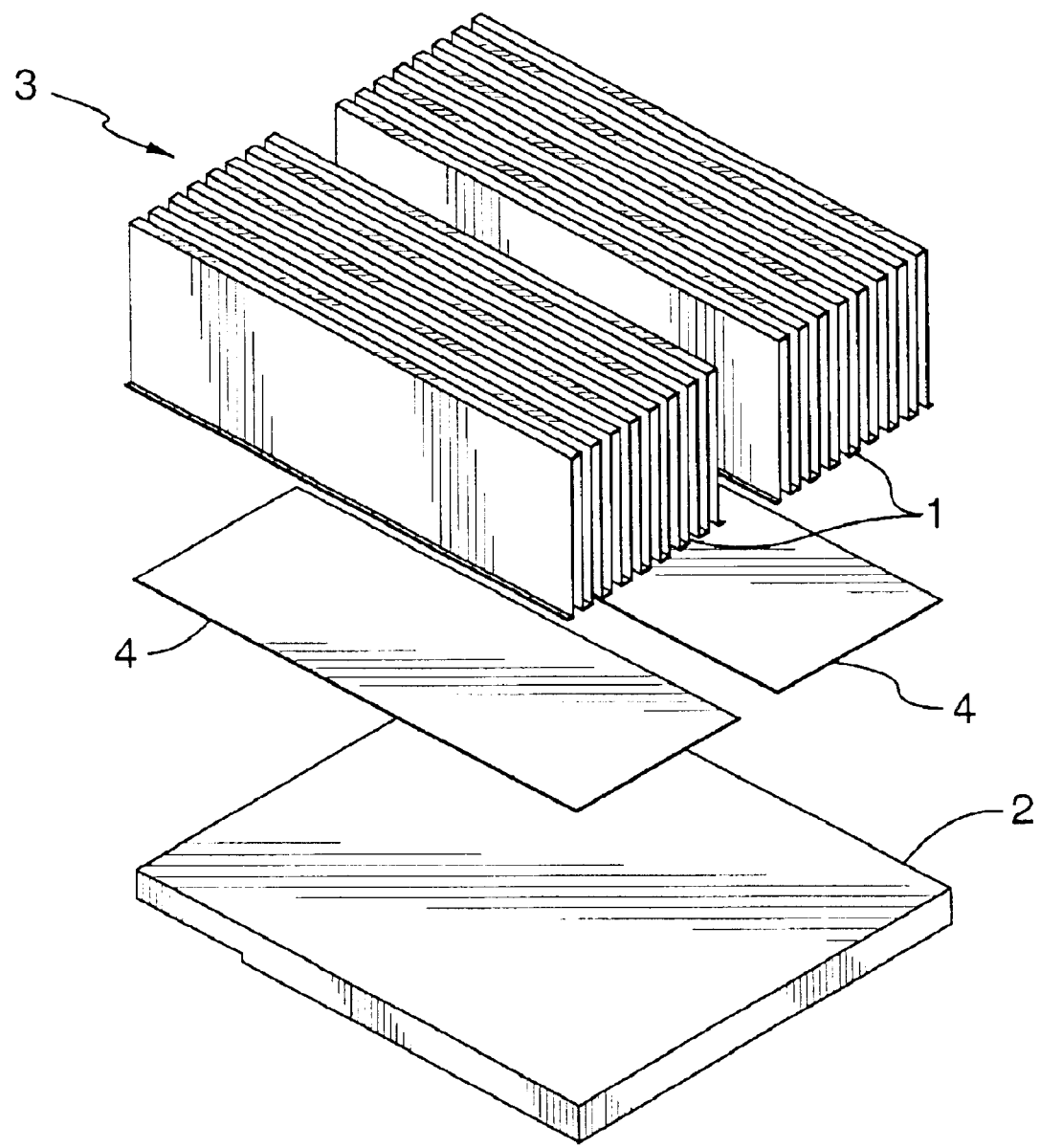

FIG. 1 is an exploded view of a folded-fin heat sink assembly 3, having aluminum folded-fin assemblies 1 located on a copper base plate 2. The base plate may be unplated or nickel plated. To assemble the folded-fin assemblies 1 to the base plate 2, the base plate is placed in a conventional assembly fixture (not shown), and solder strips 4 of thicknesses ranging from 0.005"–0.020" and cut to length and width dimensions matching the footprint of each folded-fin assembly 1 are placed on the base plate 2. A fluxing compound is then lightly applied preferably to the base plate and fins, or alternatively to both sides of the solder strips 4. The fins are then placed in the assembly fixture, which is then transferred to a solder reflow oven for controlled joining of the fins to the base plate at a suitable fixed temperature, which is preferably in a range of 5–15% above the liquidus/solidus temperature of the solder. Finally, the assembly is allowed to cool in order for the solder joint to form.

An alternate method of assembling the heat sink 3 is to place the heat sink components into a temporary fixture and laser tack weld the fins 1, solder strips 4, and base plate 2 together at multiple points. The assembly can then be transferred to the reflow oven in a fixtureless manner for the joining operation.

A further alternative is to use a hot plate instead of a reflow oven for the joining operation.

Figure 2:
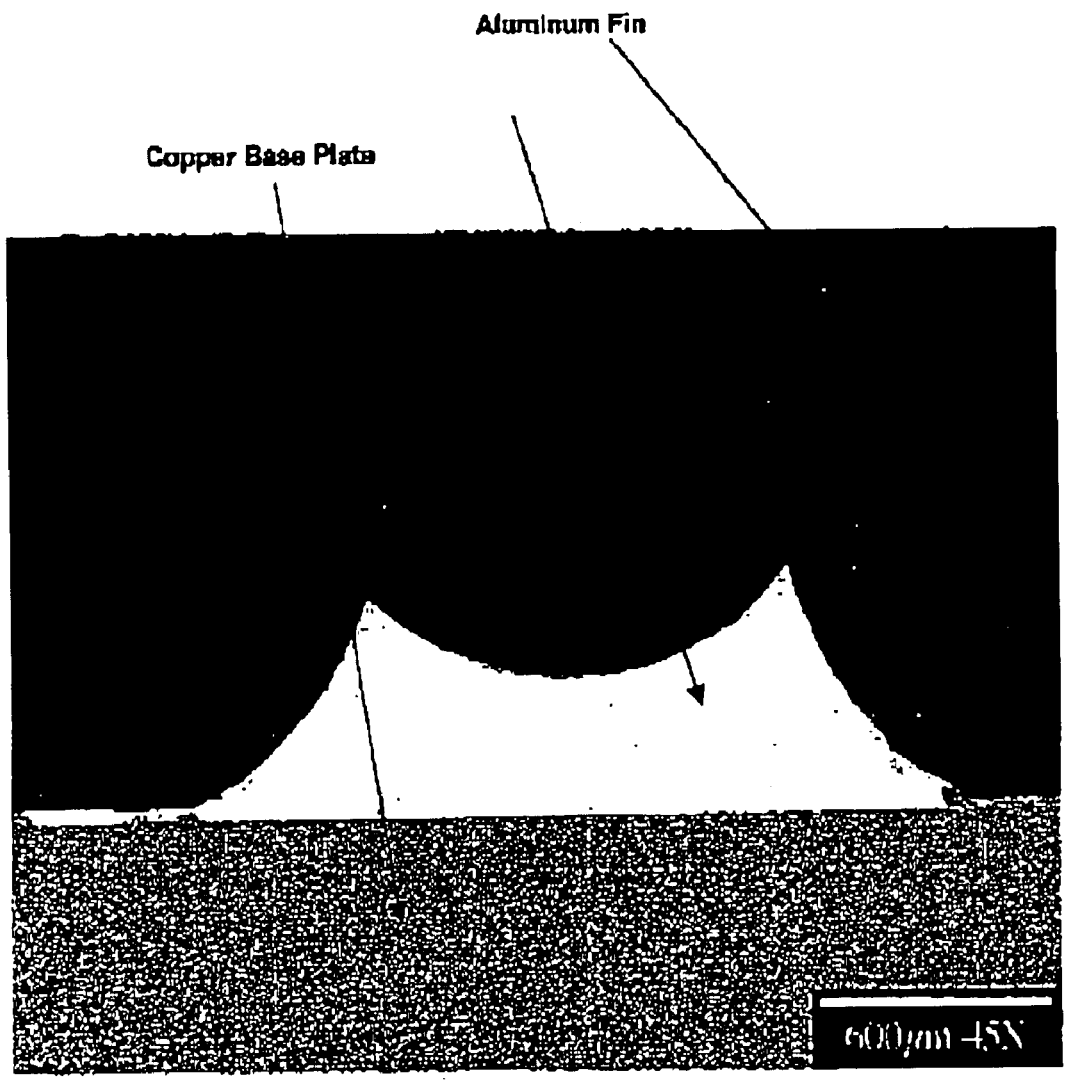

The solder strips 4 are of a unique tin/zinc (Sn/Zn) solder and are placed on the base plate, as described above. The application surface is lightly fluxed using a suitable fluxing compound such as Formula 2600 (trade-mark) sold by Kester Solder, 515 East Touhy Ave., Des Plaines, Ill., and the fins are then placed on top of the copper base and solder. The assembly is then processed ate temperature typically in the range of 220–260EC, depending on the part size and shape, which exceeds the liquidus temperature of the solder composition, following which the assembly is allowed to cool in order to form the soldered joint. FIG. 2 is a cross-sectional view of the proposed desired solder joint possessing the desirable thermal joint attributes noted in paragraph.

An alternative method of applying the solder is to use a paste instead of a sheet (or sheets). This has the advantage that it may be screened or stencilled onto the base plate and may also have the flux incorporated into the paste.

The process was compared and baselined to a process using electro less nickel plating of the fins as an intermediary, and then Sn/Pb soldering to the base plate in conventional manner. As is shown by the following Table 1, the solder is by nature harder, stronger, and more resilient than the traditional Sn—Pb solder material.

TABLE 1

| Parameter | Unit | Sn-Pb (Conventionally used) | Sn-Zn |
|---|---|---|---|
| Alloy Composition | % | Sn63-Pb37 | Sn91-Zn9 |
| Liquidus/Solidus | Degrees C. | 183 | 183 |
| Density | g/cm$^3$ | 8.64 | 7.28 |
| Hardness | HV | 12.8 | 21.3 |
| Tensile Strength | kg/mm$^2$ | 4.51 | 4.55 |
| Shearing Strength | kg/mm$^2$ | 4.84 | 4.88 |
| Elongation | % | 34.5 | 40 |
| Young's Modulus | 10$^3$ kg/mm$^2$ | 4.1 | 5.3 |

A thermal shock test was also completed on the two groups of components; this test revealed that the Sn—Zn soldered heat sinks had superior thermal performance after testing to the Sn—Pb soldered heat sinks and thermal shock testing reveals a more resilient bond. The copper to aluminum bond is observed to have an equivalent thermal resistance to copper joined to nickel plated aluminum through conventional Sn—Pb solder. In the thermal shock test, the two targeted groups were subjected to 1000 cycles of +70 degrees Celsius and –5 degrees Celsius in which the transfer time was less than 2 seconds between the two extremes. A ten minute dwell time was specified for each temperature in between cycles. Upon completion of the two groups, the Sn—Pb test group indicated a slight thermal performance degradation of 1.5%, whereas the Sn—Zn test group indicated a slight thermal performance improvement of 2.7%.

The above-described embodiments of the invention are intended to be examples of the invention. Alterations, modifications and variations may be effected the particular embodiments by those of skill in the art, without departing from the scope of the invention which is defined solely by the claims appended hereto.

We claim:

1. A folded fin heat sink assembly comprising at least one aluminum folded fin assembly mounted on a copper bass plate, each said folded tin assembly comprising a lower web to contact said base plate, an upwardly extending fin portion, an upper web, a downwardly extending fin portion, and so on, repeating in a progressive zig-zag fashion, each said folded fin assembly being soldered to said copper base plate by means of a Sn—Zn solder.

2. A folded fin heat sink assembly according to claim 1, produced by the steps of:
   (a) placing a sheet of Sn—Zn solder material on said base plate;
   (b) piecing said folded fin assembly on said solder sheet, with said lower web portions thereof against said base plate and solder sheet;
   (c) heating said base plate, said folded fin assembly and said solder to a temperature exceeding the liquidus temperature of said solder and allowing said solder to flow, and
   (d) cooling said solder to form a soldered joint between said base plate and said lower web portions of said folded fin assembly.

3. A folded fin heat sink assembly according to claim 2, wherein said heating is in the range of about 220–260 degrees Celsius.

4. A folded fin heat sink assembly according to claim 2, wherein flux is applied to one of the group consisting of: (a) said base plate and said fins, and (b) upper and lower surfaces of said sheet of solder material, prior to the steps of claim 2.

5. A folded tin heat sink assembly according to claim 1, wherein said solder comprises about 91% Sn and about 9% Zn.

6. A folded fin heat sink assembly according to claim 1, wherein said base plate is unplated.

7. A folded fin heat sink assembly according to claim 1, wherein said base plate is nickel plated.

* * * * *

UNITED STATES PATENT AND TRADEMARK OFFICE
CERTIFICATE OF CORRECTION

PATENT NO.    : 6,793,011 B2
DATED         : September 21, 2004
INVENTOR(S)   : Ross D. Armstrong, Alin Lla and Victor Kheil It is certified that error appears in the above-identified patent and that said Letters Patent is hereby corrected as shown below:

<u>Column 4,</u>
Line 55, "folded tin" should read -- folded fin --
Line 65, "copper bass" should read -- copper base --

<u>Column 5,</u>
Line 9, "(b)piecing" should read -- (b)placing --

<u>Column 6,</u>
Line 9, "folded tin" should read -- folded fin --

Signed and Sealed this

Twenty-ninth Day of March, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,793,011 B2 |
| APPLICATION NO. | : 10/073991 |
| DATED | : September 21, 2004 |
| INVENTOR(S) | : Ross D. Armstrong et al. |

Page 1 of 1

It is certified that error appears in the above-identified patent and that said Letters Patent is hereby corrected as shown below:

Title Page

Item (75) Inventor name "Alin Lla" should read --Alin Ila--.

Signed and Sealed this

Third Day of February, 2009

JOHN DOLL
*Acting Director of the United States Patent and Trademark Office*